US010584000B2

(12) United States Patent
Nakano

(10) Patent No.: US 10,584,000 B2
(45) Date of Patent: Mar. 10, 2020

(54) COMMUNICATION DEVICE AND SYSTEM INCLUDING COMMUNICATION DEVICE

(71) Applicant: OMRON Corporation, Kyoto-shi, Kyoto (JP)

(72) Inventor: Yoshimitsu Nakano, Ritto (JP)

(73) Assignee: OMRON Corporation, Kyoto-shi (JP)

( * ) Notice: Subject to any disclaimer, the term of this patent is extended or adjusted under 35 U.S.C. 154(b) by 159 days.

(21) Appl. No.: 15/537,659

(22) PCT Filed: Aug. 7, 2015

(86) PCT No.: PCT/JP2015/072487
§ 371 (c)(1),
(2) Date: Jun. 19, 2017

(87) PCT Pub. No.: WO2016/113939
PCT Pub. Date: Jul. 21, 2016

(65) Prior Publication Data
US 2017/0341876 A1 Nov. 30, 2017

(30) Foreign Application Priority Data

Jan. 15, 2015 (JP) ................. 2015-005567

(51) Int. Cl.
*B65G 47/49* (2006.01)
*G06K 7/10* (2006.01)
(Continued)

(52) U.S. Cl.
CPC ............. *B65G 47/49* (2013.01); *G05B 19/12* (2013.01); *G05B 19/418* (2013.01);
(Continued)

(58) Field of Classification Search
CPC .. G06K 7/10009; G05B 19/05; G01D 4/0006; G01V 1/223; G01S 13/751; G01S 13/758; A01K 29/005
See application file for complete search history.

(56) References Cited

U.S. PATENT DOCUMENTS 3,247,509 A * 4/1966 Hamann ................ G01S 13/751
342/44
3,754,250 A * 8/1973 Bruner ................... G01D 4/006
342/44
(Continued)

FOREIGN PATENT DOCUMENTS

JP S63-003394 A 1/1988
JP H10-145311 A 5/1998
(Continued)

OTHER PUBLICATIONS

Extended European search report dated Jan. 4, 2018 in a counterpart European patent application.
(Continued)

*Primary Examiner* — Bernarr E Gregory
(74) *Attorney, Agent, or Firm* — Metrolex IP Law Group, PLLC

(57) ABSTRACT

A communication device includes a communicator that communicates with an RF tag in a non-contact manner, a communication unit that exchanges data with a host device, and a controller that controls the communicator and the communication unit. Every time the communicator sequentially reads data from the RF tag that passes a communication-feasible region near the communicator at regular time intervals or irregular time intervals, the controller updates first data to be exchanged with the host device by the communication unit so as to include the read data. Also, the controller updates second data to be exchanged with the host (Continued)

device by the communication unit to a value different from a previous value in association with timing with which the first data is updated.

10 Claims, 12 Drawing Sheets

(51) Int. Cl.
G05B 19/418 (2006.01)
G06K 17/00 (2006.01)
H04B 1/59 (2006.01)
G05B 19/12 (2006.01)
H04W 4/80 (2018.01)
G05B 19/05 (2006.01)
H04B 5/00 (2006.01)
B65G 47/00 (2006.01)

(52) U.S. Cl.
CPC ..... *G06K 7/10009* (2013.01); *G06K 7/10297* (2013.01); *G06K 7/10435* (2013.01); *G06K 7/10445* (2013.01); *G06K 17/00* (2013.01); *H04B 1/59* (2013.01); *H04B 5/0062* (2013.01); *G05B 19/05* (2013.01); *G05B 2219/23078* (2013.01); *G06K 7/10425* (2013.01); *H04W 4/80* (2018.02)

(56) References Cited

U.S. PATENT DOCUMENTS

| | | | | |
|---|---|---|---|---|
| 4,042,906 | A * | 8/1977 | Ezell | G01V 1/223 367/77 |
| 4,075,632 | A * | 2/1978 | Baldwin | A01K 29/005 340/870.01 |
| 4,086,504 | A * | 4/1978 | Ezell | G01V 1/223 342/50 |
| 4,656,463 | A * | 4/1987 | Anders | G01S 13/78 340/10.34 |
| 4,912,471 | A * | 3/1990 | Tyburski | G01S 13/758 340/10.34 |
| 2001/0016479 | A1 * | 8/2001 | Wood, Jr. | G06K 7/0008 455/277.1 |
| 2003/0183697 | A1 * | 10/2003 | Porter | G06K 7/0008 235/492 |
| 2005/0017844 | A1 * | 1/2005 | Cole | G06K 7/0008 340/10.1 |
| 2006/0132310 | A1 * | 6/2006 | Cox | G06Q 10/08 340/572.1 |
| 2007/0126578 | A1 * | 6/2007 | Broussard | G06Q 10/087 340/572.1 |
| 2008/0094182 | A1 * | 4/2008 | Sugano | G06K 7/10039 340/10.5 |
| 2008/0100442 | A1 * | 5/2008 | Grunwald | H04L 63/20 340/572.1 |
| 2008/0100443 | A1 * | 5/2008 | Grunwald | H04L 63/0492 340/572.1 |
| 2009/0002169 | A1 * | 1/2009 | Oozawa | G06K 17/00 340/572.1 |
| 2009/0127325 | A1 | 5/2009 | Macurek et al. | |
| 2010/0214073 | A1 | 8/2010 | Kasai et al. | |
| 2010/0277319 | A1 | 11/2010 | Goidas et al. | |
| 2011/0274275 | A1 * | 11/2011 | Seitz | G06Q 10/08 380/270 |
| 2011/0309931 | A1 * | 12/2011 | Rose | G01S 5/0009 340/539.13 |
| 2012/0109797 | A1 * | 5/2012 | Shelton | B60L 3/0069 705/34 |
| 2012/0146774 | A1 | 6/2012 | Kasai et al. | |
| 2014/0285323 | A1 | 9/2014 | Koezuka | |

FOREIGN PATENT DOCUMENTS

| | | | |
|---|---|---|---|
| JP | 2006-155247 A | 6/2006 | |
| JP | 2008-070957 A | 3/2008 | |
| JP | 2010-250584 A | 11/2010 | |
| JP | 2014-183437 A | 9/2014 | |
| WO | WO99/16015 A2 * | 4/1999 | ........... G06K 7/0008 |
| WO | 2008146520 A1 | 12/2008 | |

OTHER PUBLICATIONS

International Search Report of PCT/JP2015/072487 dated Sep. 29, 2015.
Office Action dated Oct. 9, 2018 in a counterpart Japanese patent application.
Japanese Office Action dated Apr. 10, 2018 in a counterpart Japanese Patent application.
Communication pursuant to Article 94(3) EPC dated Dec. 3, 2019 in a counterpart European patent application.

* cited by examiner

COMMUNICATION DEVICE AND SYSTEM INCLUDING COMMUNICATION DEVICE

TECHNICAL FIELD

The present invention relates to a communication device that communicates with a radio frequency (RF) tag in a non-contact manner, and a system including the communication device.

BACKGROUND ART

Conventionally, short-distance radio communication technology that exchanges data in a non-contact manner has been used in various fields. Typically, short-distance radio communication technology called radio frequency identification (RFID) is widely used. A general system using RFID includes an RF tag attached to a management target article or an object that supports or accommodates the article (such as a pallet and a container), a communication device configured to exchange data with the RF tag (hereinafter referred to as "reader writer"), and a host device configured to control the reader writer (for example, see Japanese Unexamined Patent Publication No. 2014-183437 (Patent Document 1)).

In production sites and logistics sites, enhanced processing speed or the like in the RFID system is required in order to increase production efficiency. For example, as a configuration to exchange data between a reader/writer unit and a controller (PLC), Japanese Unexamined Patent Publication No. 2010-250584 (Patent Document 2) discloses a programmable/logic & RFID controller that employs a shared bus and a shared memory instead of serial communication connection. Note that the controller can correspond to the host device in the configuration disclosed in Patent Document 2.

PRIOR ART DOCUMENTS

Patent Documents

Patent Document 1: Japanese Unexamined Patent Publication No. 2014-183437
Patent Document 2: Japanese Unexamined Patent Publication No. 2010-250584

SUMMARY OF THE INVENTION

Problems to be Solved by the Invention

The above-described configuration disclosed in Patent Document 2 can implement concurrent processing between the reader/writer unit and the controller. Meanwhile, it is necessary to transmit RFID issue data to a PLC function unit every time the reader/writer unit decodes the RFID issue data, complicating a procedure of data exchange.

In addition, when the PLC function unit is busy, the reader/writer unit cannot transmit the RFID issue data, and loss of processing time can occur. Meanwhile, a time interval at which a target RF tag arrives at a region in which the communication device can communicate with the RF tag (hereinafter referred to as "communication-feasible region") is not necessarily constant. The time interval may vary according to various external factors. Therefore, it is necessary to appropriately adjust processing timing and the like in the reader/writer unit and the PLC function unit to prevent timing with which the reader/writer unit transmits the RFID issue data to the PLC function unit from overlapping with a period in which the PLC function unit is busy.

From the foregoing background, a configuration that allows easier set up of data exchange between the communication device and the host device is desired.

Means for Solving the Problem

A communication device according to one aspect of the present invention includes a communicator that communicates with an RF tag in a non-contact manner, a communication unit that exchanges data with a host device, and a controller that controls the communicator and the communication unit. Every time the communicator sequentially reads data from the RF tag that passes a communication-feasible region near the communicator at regular time intervals or irregular time intervals, the controller updates first data to be exchanged with the host device by the communication unit so as to include the read data. Also, the controller updates second data to be exchanged with the host device by the communication unit to a value different from a previous value in association with timing with which the first data is updated.

As the update value of the second data, the controller may alternately set a first status value and a second status value.

The controller may increment the second data value in association with the timing with which the first data is updated.

The controller may update the first data and the second data with identical timing.

The controller may maintain the second data at the updated value until further updating the first data.

A system according to another aspect of the present invention includes a communication device and a host device. The communication device includes a communicator configured to communicate with an RF tag in a non-contact manner, a communication unit configured to exchange data with the host device, and a controller configured to control the communicator and the communication unit. Every time the communicator sequentially reads data from the RF tag that passes a communication-feasible region near the communicator at regular time intervals or irregular time intervals, the controller updates first data to be exchanged with the host device by the communication unit so as to include the read data. Also, the controller updates second data to be exchanged with the host device by the communication unit to a value different from a previous value in association with timing with which the first data is updated. The host device acquires the first data in response to update of the second data value.

Effect of the Invention

The embodiment allows easier set up of data exchange between the communication device and the host device.

MODE FOR CARRYING OUT THE INVENTION

Figure 1:
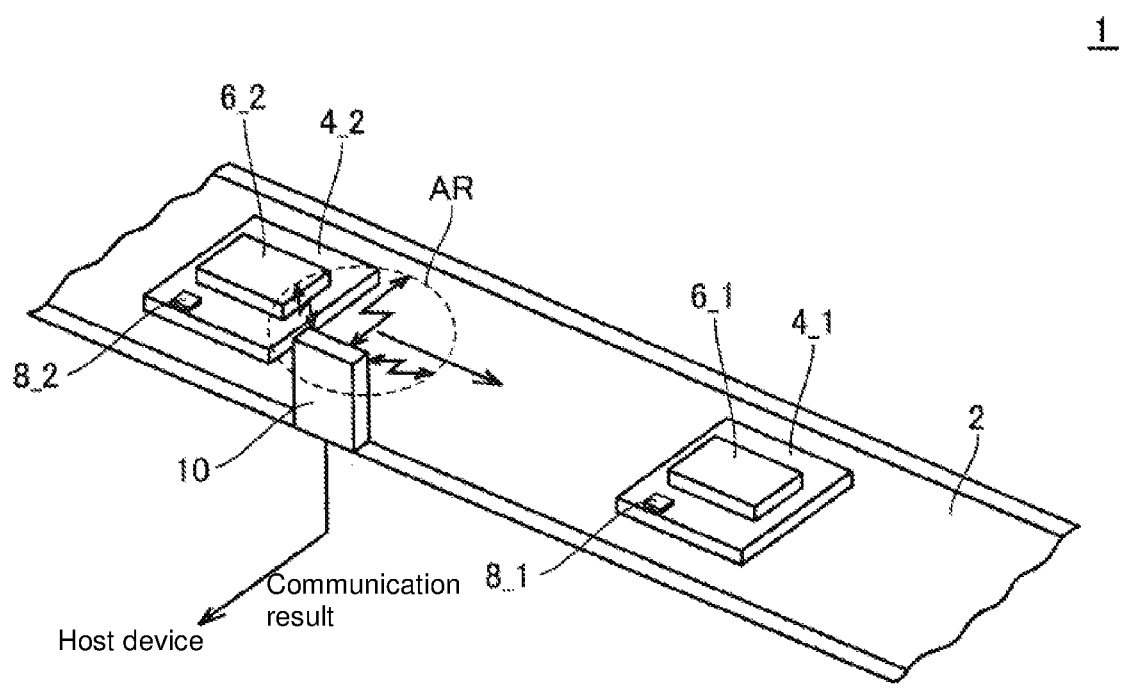
FIG. 1 is a schematic view illustrating one example of a usage form of an RFID system of the embodiment.

An embodiment of the present invention will be described in detail with reference to the drawings. Note that the same or corresponding portions in the drawings have the same reference numerals, and description thereof will not be repeated.

Hereinafter, an RFID system will be described as a typical example of a system including a communication device that performs short-distance radio communication. Since the communication device is often referred to as "reader writer" in a general RFID system with attention paid to functions thereof, the communication device is referred to as "reader writer" in the following description. However, it is not essential that the communication device has both a function of reading data from a radio frequency (RF) tag (reader function) and a function of writing data into the RF tag (writer function). The communication device may have only one of the reader function and the writer function.

While the RF tag may be referred to as an integrated circuit (IC) tag or an RFID tag, the term "RF tag" is used in the following description for convenience.

While RFID will be described as a typical example of short-distance radio communication, this is not restrictive, and for example, an improved new method or the like based on RFID technology in the future may be included in the technical scope of this invention.

<A. Outline of RFID System>

FIG. 1 is a schematic view illustrating one example of a usage form of an RFID system according to the embodiment. FIG. 1 illustrates an RFID system 1 for a conveying line in which works 6 placed on pallets 4 are sequentially conveyed by a conveyor belt 2. More specifically, a work 6_1 is placed on a preceding pallet 4_1, and a work 6_2 is placed on a following pallet 4_2. The pallets 4_1 and 4_2 are equipped with RF tags 8_1 and 8_2, respectively.

A reader writer 10 is placed around the conveyor belt 2. When the pallet 4 enters a region in which the reader writer 10 can communicate with the RF tag 8 (hereinafter referred to as "communication-feasible region AR"), communication starts between the reader writer 10 and the RF tag 8. That is, the RFID system 1 is for applications in which the reader writer 10 and the RF tag 8 repeatedly communicate with each other. Communication processing is repeated by the RF tag 8 passing near the reader writer 10 sequentially. The reader writer 10 starts communication when the RF tag 8 enters the communication-feasible region AR, and sequentially sends a result acquired by the communication (hereinafter referred to as "communication result") to a host device. Note that as the "communication result", in addition to data itself read from the RF tag 8, various kinds of additional information (for example, a status value and the like indicating a status during reading) may be added. Also, when data reading from the RF tag 8 fails, only information indicating the failure of the data reading may be defined as the "communication result."

The host device may be any device as long as the host device has a function of receiving the communication result from the reader writer 10, and typically various controllers, personal computers, and the like are assumed.

The reader writer 10, and the RFID system 1 including the reader writer 10 and the host device of the embodiment have at least a novel configuration in a communication interface. The novel configuration is a configuration for the reader writer 10 to repeatedly communicate with the RF tag 8 and to sequentially send the communication result to the host device. The novel configuration of the communication interface will be described in detail below.

<B. Hardware Configuration of Reader Writer 10>

To begin with, a hardware configuration of the reader writer 10 will be described. The reader writer 10 mainly includes a function of communicating with the RF tag 8, and a function of sending, to the host device, the communication result acquired by the communication with the RF tag 8.

Figure 2:
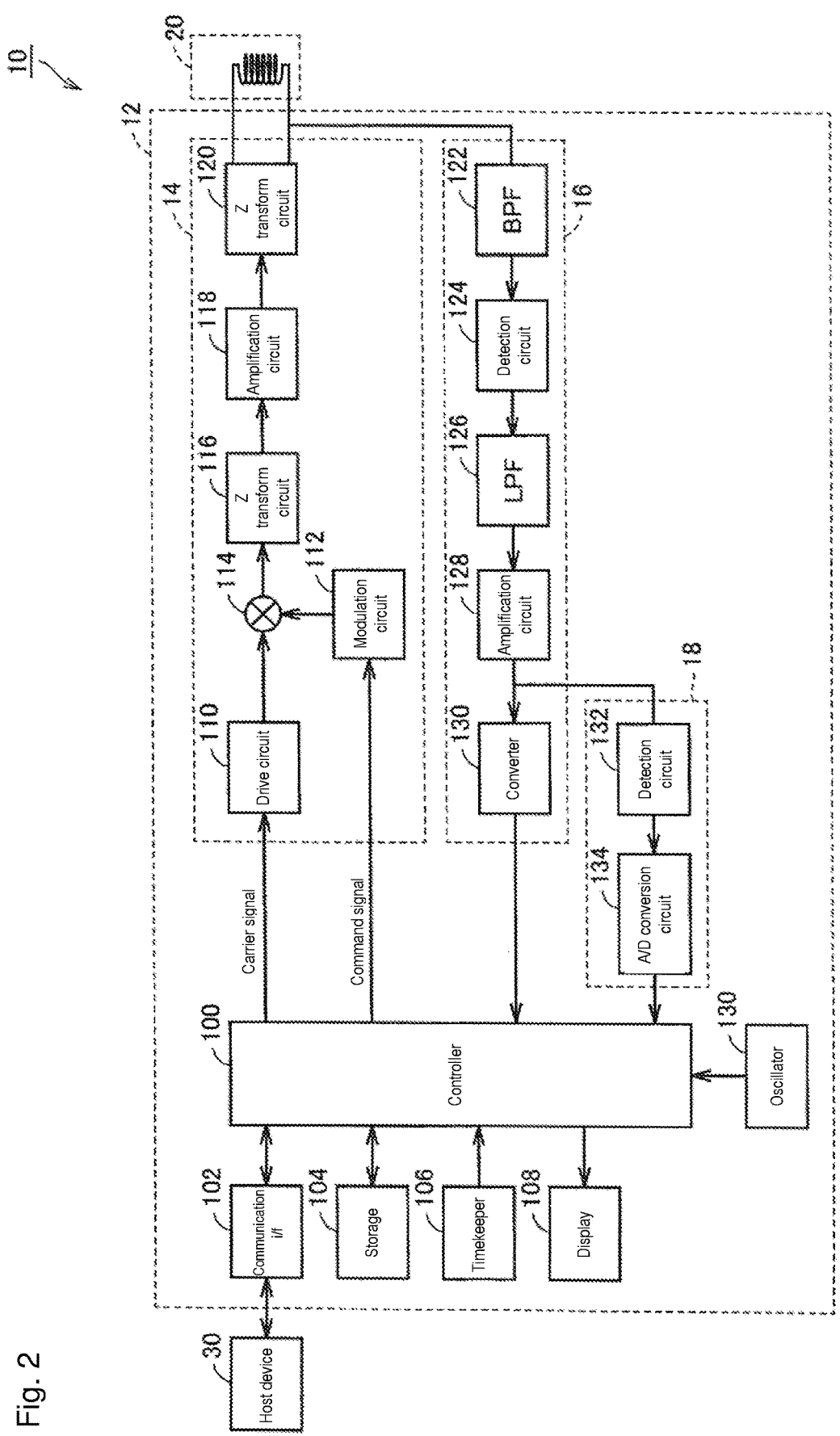
FIG. 2 is a block diagram illustrating one example of a hardware configuration of a reader writer of the embodiment.

FIG. 2 is a block diagram illustrating one example of the hardware configuration of the reader writer 10 of the embodiment. With reference to FIG. 2, the reader writer 10 includes a communication controller 12 including a controller 100 and an antenna 20 including an antenna coil 140. Note that FIG. 2 illustrates an exemplary configuration in which the antenna 20 is a separate body from the communication controller 12, but the antenna 20 and the communication controller 12 may be integrated.

In addition to the controller 100, the communication controller 12 includes a transmitter 14, a receiver 16, a reception level detector 18, a communication interface (I/F) 102, a storage 104, a timekeeper 106, a display 108, and an oscillation circuit 136.

The controller 100 is an arithmetic processor configured to control various processes in the reader writer 10, and is typically implemented by a processor, such as a central processing unit (CPU), executing a program. Alternatively, all or part of the controller 100 may be implemented using hardware such as an application specific integrated circuit (ASIC).

The communication interface 102 corresponds to a communication unit configured to exchange data with the host device 30. It is sufficient for the RFID system 1 to be at least able to send data from the reader writer 10 to the host device 30. For that purpose, as the communication interface 102, any communication method may be employed, such as the Ethernet (registered trademark), serial communication, USB (universal serial bus) communication, parallel communication, and various field buses.

The storage 104 stores various programs to be executed by the controller 100, the communication result acquired from the RF tag 8, and the like. The timekeeper 106 is a clock or a timer, and outputs time data to the controller 100. The display 108 displays various pieces of information in response to instructions from the controller 100.

The oscillation circuit 136 generates a reference pulse signal for generating a carrier wave.

The transmitter 14 and the receiver 16 correspond to a communicator that communicates with the RF tag 8 in a non-contact manner. That is, the transmitter 14 generates an electromagnetic wave in order to read data from the RF tag 8, whereas the receiver 16 decodes an answering signal from the RF tag 8 and outputs a decoded result.

More specifically, the transmitter 14 includes, as principal components, a drive circuit 110, a modulation circuit 112, a multiplication circuit 114, an amplification circuit 118, and a pair of Z transform circuits 116 and 120 that sandwiches the amplification circuit 118. Meanwhile, the receiver 16 includes, as principal components, a band pass filter (BPF) 122, a detection circuit 124, a low pass filter (LPF) 126, an amplification circuit 128, and a comparator 130.

The reception level detector 18 detects a reception level of the answering signal from the RF tag 8. The reception level detector 18 includes, as principal components, a detection circuit 132 and an analog to digital (A/D) conversion circuit 134.

An operation of each unit for implementing communication processing between the reader writer 10 and the RF tag 8 will be described. Note that the controller 100 controls the transmitter 14 and the receiver 16 corresponding to the communicator, and the communication interface 102 corresponding to the communication unit.

To begin with, when a predetermined condition is satisfied, the controller 100 uses the reference pulse signal from the oscillation circuit 136 to start output of a high-frequency pulse that is a source of the carrier wave (hereinafter referred to as "carrier signal"). The drive circuit 110 converts the carrier signal into the carrier wave. The carrier wave that is output from the drive circuit 110 undergoes an impedance matching processing performed by the Z transform circuits 116 and 120, and an amplification processing performed by the amplification circuit 118. The carrier wave is then supplied to the antenna coil 140, and is sent out as an electromagnetic wave.

In addition, the controller 100 outputs a command signal of a predetermined number of bits. The command signal is an instruction to the RF tag 8, and is superimposed on the carrier wave and supplied to the RF tag 8. More specifically, the modulation circuit 112 and the multiplication circuit 114 perform amplitude modulation on the carrier wave in accordance with the command signal from the controller 100. Accordingly, the command signal is superimposed on the carrier wave.

The RF tag 8 within the communication-feasible region AR can receive the electromagnetic wave sent out from the antenna coil 140. The received electromagnetic wave generates induced electromotive force within the RF tag 8, and the induced electromotive force activates a controller within the RF tag 8 (not illustrated). In this state, on receipt of the command signal superimposed on the carrier wave, the controller of the RF tag 8 decodes the received command signal, performs processing in accordance with a command acquired by the decoding, generates the answering signal including a result of the processing, and finally sends the answering signal to the reader writer 10.

The answering signal from the RF tag 8 is received by the antenna coil 140 and is input into the band pass filter 122. The band pass filter 122 eliminates noise included in the received answering signal. The detection circuit 124 detects the carrier wave included in the answering signal. The low pass filter 126 eliminates a carrier wave component from the answering signal and extracts the answering signal from the RF tag 8. The answering signal extracted by the low pass filter 126 undergoes amplification processing performed by the amplification circuit 128. The answering signal then undergoes processing for conversion into a rectangular signal performed by the comparator 130, and is output as the rectangular signal. The controller 100 decodes the rectangular signal from the comparator 130 and outputs an answer from the RF tag 8. Furthermore, the controller 100 outputs, to the communication interface 102, the communication result including the answer acquired through the decoding.

The detection circuit 132 of the reception level detector 18 receives input of the answering signal identical to the answering signal that is input into the comparator 130, and generates an envelope signal indicating level variation of each peak of the answering signal. The A/D conversion circuit 134 performs digital conversion on the generated envelope signal. The controller 100 receives a result of the digital conversion as a reception level of the answering signal.

The communication interface 102 sends the communication result from the controller 100 to the host device 30. This transmission processing of the communication result to the host device 30 will be described in detail below.

<C. Hardware Configuration of Host Device 30>

Next, a hardware configuration of the host device 30 will be described. As a typical example of the host device 30, a control device called a programmable logic controller (PLC) will be described by way of example in the following description.

Figure 3:
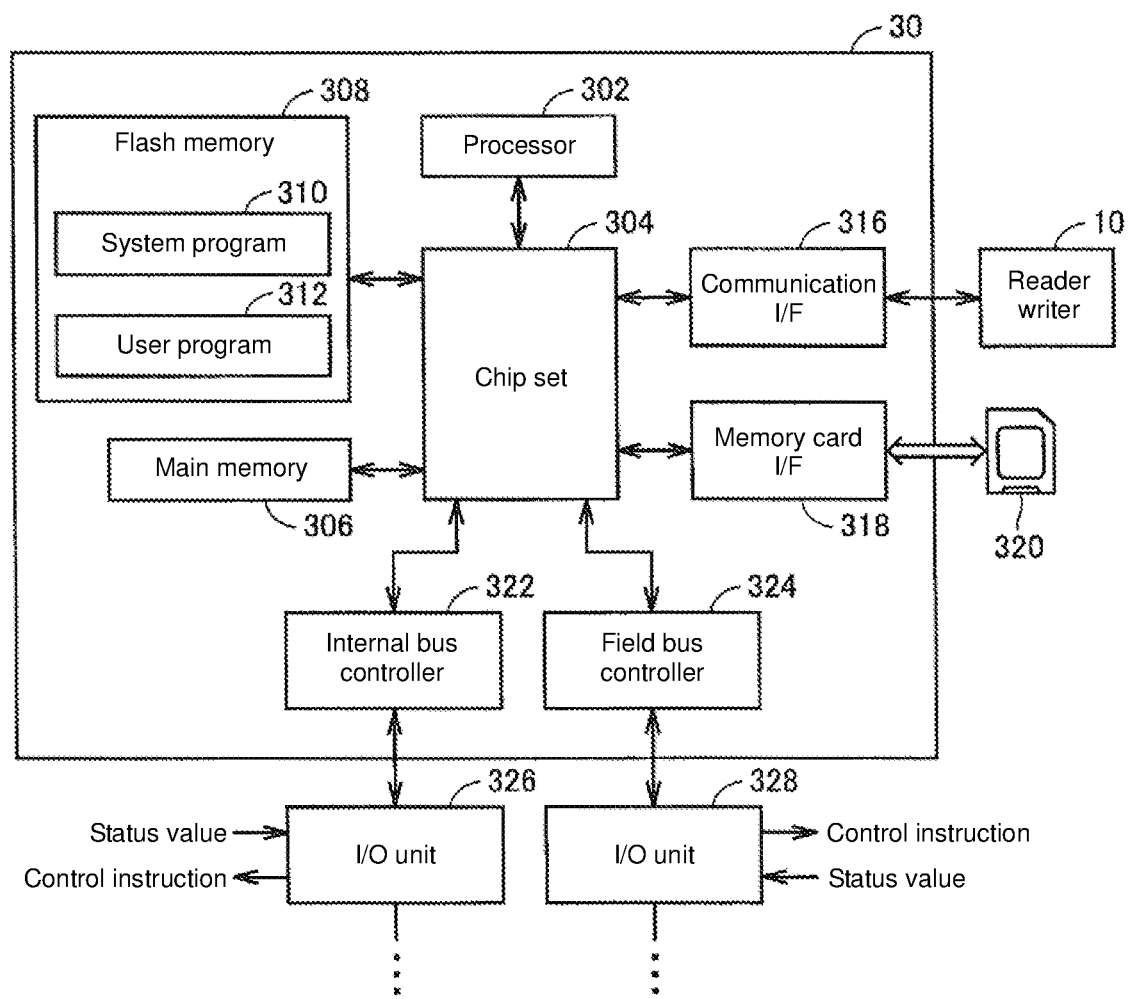
FIG. 3 is a block diagram illustrating one example of a hardware configuration of a host device of the embodiment.

FIG. 3 is a block diagram illustrating one example of the hardware configuration of the host device 30 of the embodiment. With reference to FIG. 3, the host device 30 includes a processor 302, such as a central processing unit (CPU) and a micro-processing unit (MPU), a chip set 304, a main memory 306, a flash memory 308, a communication interface 316, a memory card interface 318, an internal bus controller 322, and a field bus controller 324.

The processor 302 reads a system program 310 and a user program 312 stored in the flash memory 308, and develops and executes the system program 310 and the user program 312 in the main memory 306, thereby implementing control over a control target. The chip set 304 controls each component to implement processing as an entire PLC.

The internal bus controller 322 exchanges data with an input/output (I/O) unit 326 coupled to the PLC via an internal bus. The field bus controller 324 exchanges data with an I/O unit 328 coupled to the PLC via a field bus. The communication interface 316 exchanges data with various external devices including the reader writer 10 via various cable/radio networks. The memory card interface 318 is configured to accept a memory card 320 detachably, and can write data into the memory card 320 and read data from the memory card 320.

Part or all of functions provided by the processor 302 executing the programs may be mounted as dedicated hardware circuitry.

<D. Related Art and Problem>

Figure 4:
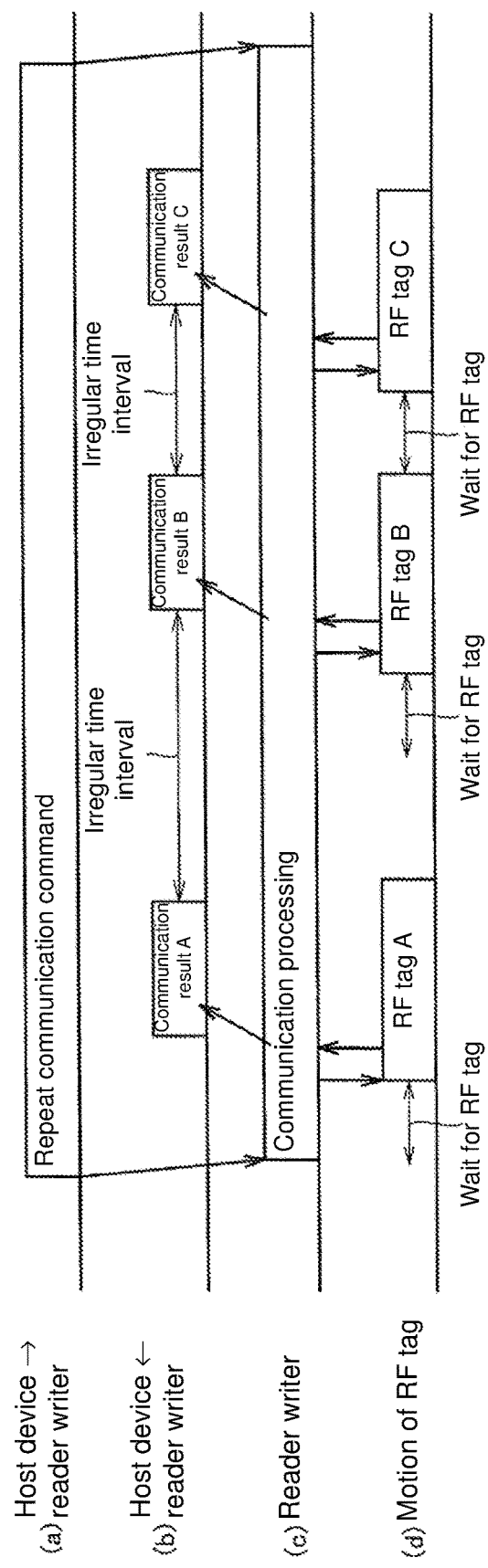
FIG. 4 is a time chart for describing a problem to be solved by the RFID system of the embodiment.

Next, a problem to be solved by the RFID system 1 of the embodiment will be described together with the related art. FIG. 4 is a time chart for describing the problem to be solved by the RFID system 1 of the embodiment. FIG. 4 illustrates a time chart when the works 6 placed on the pallets 4 are sequentially conveyed by the conveyor belt 2.

Since the host device 30 such as the PLC transmits a repeat communication command to the reader writer 10, the reader writer 10 repeatedly communicates with the RF tag 8 (see (a) Host device→reader writer, and (c) Reader writer).

Since the reader writer 10 communicates with the RF tag 8 that is within the communication-feasible region AR, during communication processing of the reader writer 10, the reader writer 10 waits until the RF tag 8 enters the communication-feasible region AR (wait for RF tag). Substantial communication processing with the target RF tag 8 starts with arrival of the RF tag 8 into the communication-feasible region AR as a trigger (see (d) Motion of RF tag). Then, the communication result acquired by the communication with the RF tag 8 is sent from the reader writer 10 to the host device 30 (see (b) Host device←reader writer).

Generally, the RF tag 8 does not pass in front of the reader writer 10 at regular time intervals. Therefore, timing to send the communication result from the reader writer 10 to the host device 30 is at irregular time intervals. It is necessary to perform communication processing with the RF tag 8 and communication result sending processing in parallel, and both processing require a certain amount of time. Therefore, it is difficult to control or adjust timing to exchange the communication result between the reader writer 10 and the host device 30. More specifically, it is necessary to securely transmit, to the host device 30, the communication result acquired from the preceding RF tag 8 after communication processing with the preceding RF tag 8 ends and before communication processing with the following RF tag 8 starts. Irregular time intervals of arrival timing of the RF tag 8 makes it difficult to control or adjust the timing. Therefore, an interface for controlling timing (synchronizing) between the reader writer 10 and the host device 30 is needed.

Such an interface between the reader writer 10 and the host device 30 according to the related art will be described. As the interface between the reader writer 10 and the host device 30, a handshake type and a hold type are typically known.

The handshake type interface is a two-way exchange in which the reader writer 10 transmits the communication result to the host device 30, and on receipt of the communication result, the host device 30 sends reception completion thereof. On the other hand, in the hold type interface, the reader writer 10 repeats the communication with the RF tag 8, and holds the communication result acquired in each communication over a certain period of time. Also, the host device 30 acquires the communication result during the period in which the communication result is held.

(d1: Interface of Related Art (Handshake Type))

Figure 5:
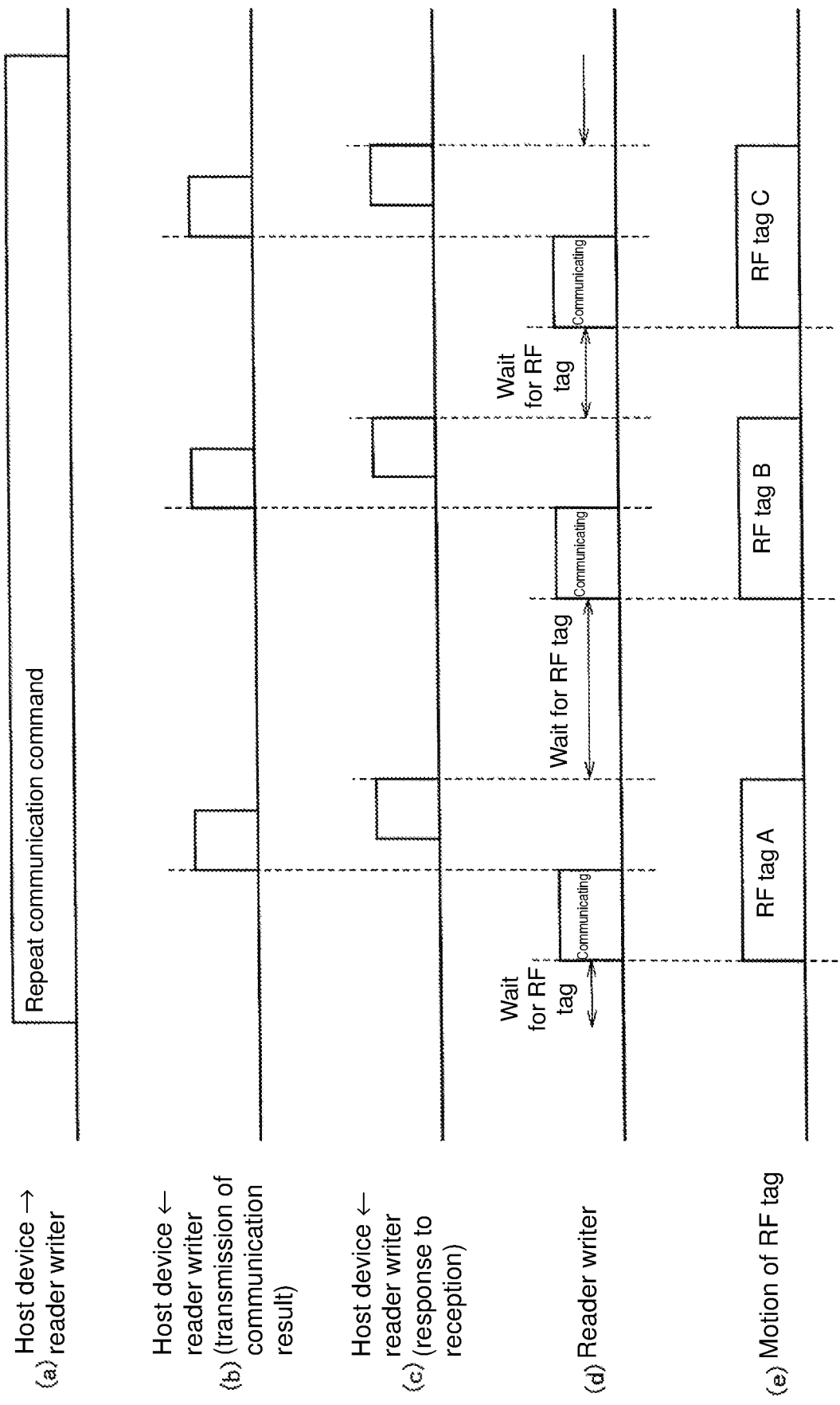
FIG. 5 is a time chart for describing a handshake type interface of the related art.

FIG. 5 is a time chart for describing the handshake type interface of the related art. In the handshake type interface illustrated in FIG. 5, it is possible to perform two-way data transmission between the reader writer 10 and the host device 30. More specifically, from the reader writer 10 to the host device 30, the communication result acquired from the RF tag 8 is transmitted sequentially (see (b) Host device-←reader writer (transmission of communication result)). Also, from the host device 30 to the reader writer 10, notification is made that reception of the transmitted communication result is completed (success) ((c) Host device-→reader writer (response to reception)). Then, the reader writer 10 waits until the following RF tag 8 enters the communication-feasible region AR. That is, the reader writer 10 can perform communication processing with the following RF tag 8 only after receiving the response to reception from the host device 30.

Such alternate exchange of the communication result and the reception completion of the communication result between the reader writer 10 and the host device 30 allows secure transmission of the communication result from the reader writer 10 to the host device 30.

Meanwhile, the handshake type interface can have the following problem.

That is, there is a problem that it is necessary to mount handshake processing in the host device 30, and that costs are needed for mounting a program in the host device 30 and the like. Specifically, upon detection of conversion result transmission from the reader writer 10, the host device 30 changes a flag of the response to reception to on, maintains the flag over a predetermined time period, and then returns the flag to off. The single host device 30 is connected to a plurality of reader writers 10 in many cases, and in such cases, the program to be mounted on the host device 30 will be complicated.

In addition, communication processing with the RF tag 8 is not performed during a period after communication processing with the preceding RF tag 8 is finished and until handshake processing is completed. Therefore, if the RF tag 8 passes through the communication-feasible region AR during this period, communication can be lost. That is, even the RF tag 8 conveyed along a normal route can cause detection loss, and for example, can cause a traceability problem.

(d2: Interface of Related Art (First Hold Type))

Figure 6:
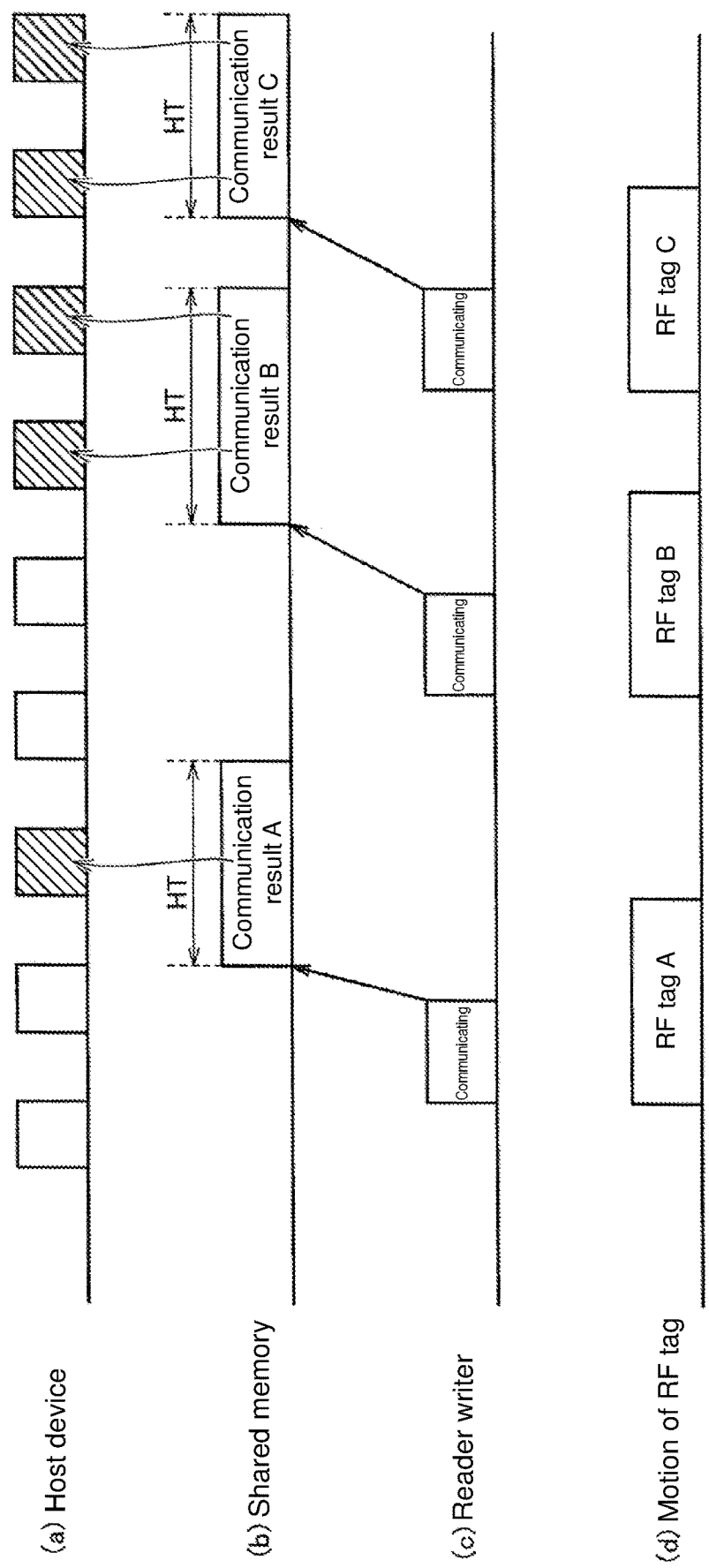
FIG. 6 is a time chart for describing a (first) hold type interface of the related art.

FIG. 6 is a time chart for describing the (first) hold type interface of the related art. In the hold type interface illustrated in FIG. 6, a memory area accessible to both the reader writer 10 and the host device 30 (shared memory) is provided. The reader writer 10 sequentially writes the communication result acquired from the RF tag 8 into the shared memory. The reader writer 10 holds the communication result written into the shared memory for at least predetermined hold time HT (see (b) Shared memory).

On the other hand, the host device 30 can acquire the communication result acquired by the reader writer 10 by accessing data on the shared memory at a time interval sufficiently shorter than the hold time HT (polling monitoring).

In the hold type interface illustrated in FIG. 6, the hold time HT cannot be longer than the minimum time interval at which the RF tag 8 arrives, and the time interval at which the host device 30 performs polling monitoring needs to be sufficiently shorter than the hold time HT. Therefore, it is sometimes difficult to adjust the hold time HT and the time interval of the polling monitoring.

(d3: Interface of Related Art (Second Hold Type))

Figure 7:
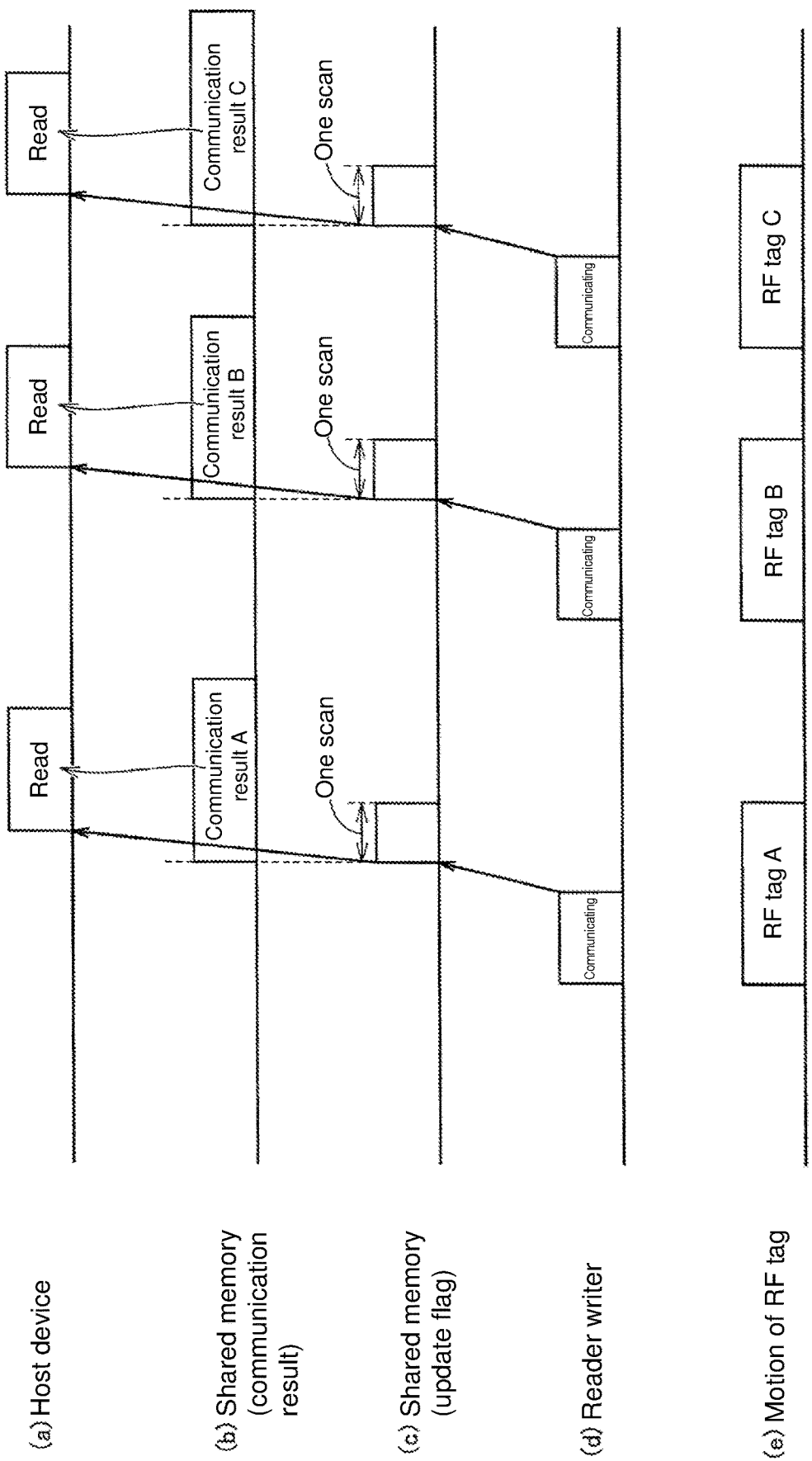
FIG. 7 is a time chart for describing the (second) hold type interface of the related art.

FIG. 7 is a time chart for describing the (second) hold type interface of the related art. In the hold type interface illustrated in FIG. 7, a memory area accessible to both the reader writer 10 and the host device 30 (shared memory) is provided. The reader writer 10 sequentially writes the communication result acquired from the RF tag 8 into the shared memory (see (b) Shared memory (communication result)). At that time, the reader writer 10 changes an update flag of the shared memory to on for only one scan period to notify the writing of the communication result into the shared memory (see (c) Shared memory (update flag)).

The host device 30 reads the communication result from the shared memory with the change of the update flag on the shared memory from off to on as a trigger.

Since the update flag of the shared memory is changed to on for only one scan period in the hold type interface illustrated in FIG. 7, mounting using the shared memory or the like does not cause loss. However, with a communication method that does not ensure real time processing (synchronization) such as the Ethernet, mounting is difficult.

<E. Solution>

The reader writer 10 (communication device) and the RFID system 1 including the reader writer 10 of the embodiment implement a configuration that allows easier setup of data exchange between the reader writer 10 (communication device) and the host device 30. In addition, a configuration that allows secure transmission of the communication result to the host device 30 is implemented even in a case where the reader writer 10 (communication device) and the host device 30 are connected through the communication method that does not ensure real time processing (synchronization) such as the Ethernet.

Figure 8:
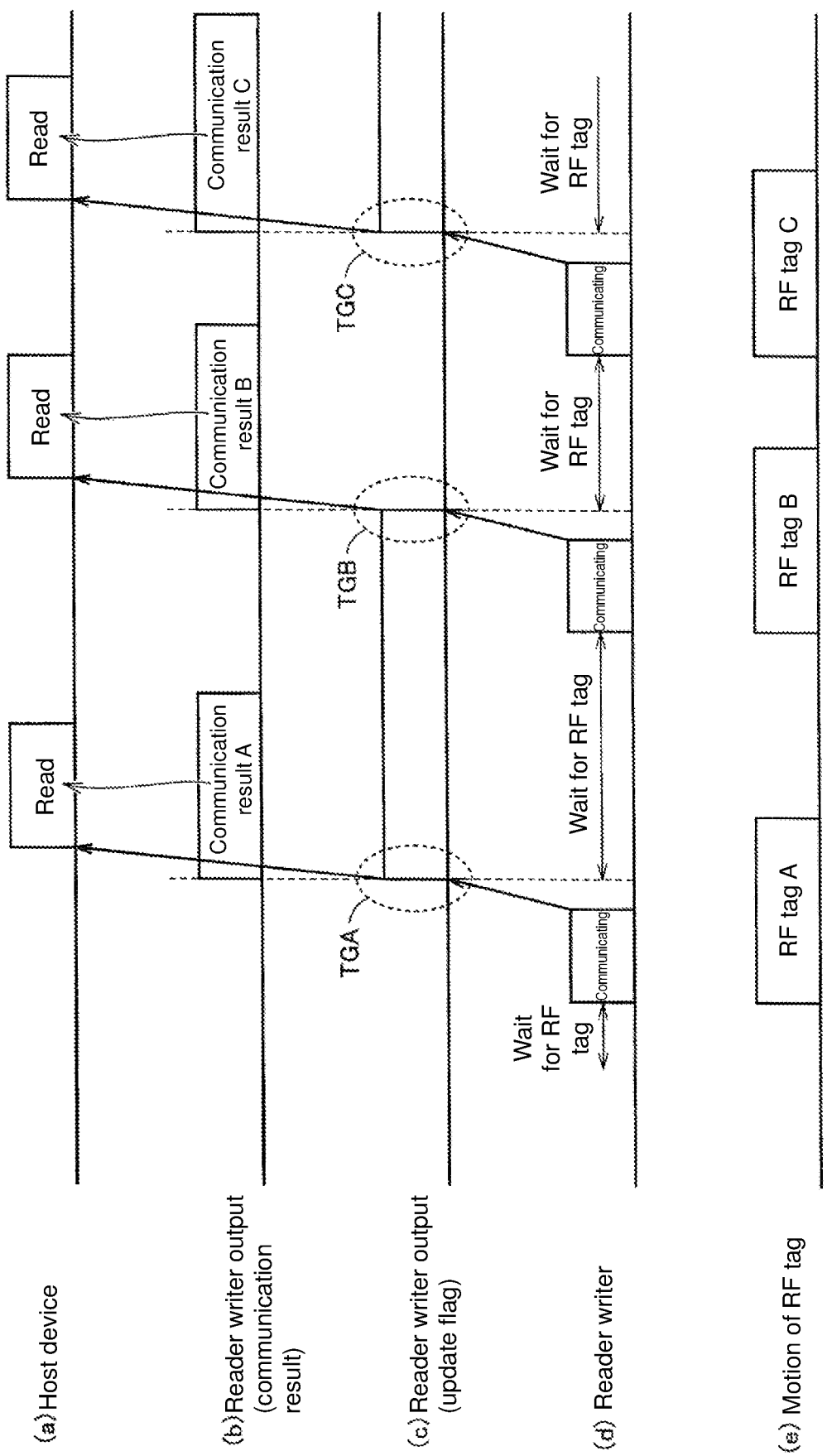
FIG. 8 is a time chart for describing an interface between the reader writer (communication device) and the host device in the RFID system of the embodiment.

FIG. 8 is a time chart for describing the interface between the reader writer 10 (communication device) and the host device 30 in the RFID system 1 of the embodiment. FIG. 8 illustrates a time chart of output, to the host device 30, of data sequentially read by a communicator of the reader writer 10 (transmitter 14 and receiver 16) from the RF tag 8 that passes the communication-feasible region AR (see FIG. 1 and the like) near the communicator at regular time intervals or irregular time intervals.

In the RFID system 1 of the embodiment, when outputting the communication result acquired from the new RF tag 8, the reader writer 10 outputs together a signal that notifies the output of the new communication result, that is, update (switching) of the communication result. Then, when the output (update) of the communication result acquired from the certain RF tag 8 is completed, the reader writer 10 waits so as to start communication processing for the following RF tag 8 at any time.

In other words, every time data is sequentially read from the RF tag 8 that passes the communication-feasible region AR, the controller 100 of the reader writer 10 (FIG. 2) updates the communication result (first data) to be exchanged with the host device 30 by the communication interface 102 (communication unit) so as to include the read data (see (b) Reader writer output (communication result)). Also, in association with timing with which the communication result (first data) is updated, the controller 100 of the reader writer 10 updates the update flag (second data) to be exchanged with the host device 30 by the communication interface 102 (communication unit) to a value different from a previous value (see (c) Reader writer output (update flag)).

In the time chart illustrated in FIG. 8, as a specific example to update the update flag (second data) to a value different from a previous value, a toggle signal (or a flicker signal) is employed. That is, the controller 100 of the reader writer 10 (FIG. 2) alternately sets on (first status value) and off (second status value) as update values of the update flag (second data).

That is, when an RF tag A enters the communication-feasible region AR, communication processing is performed with the RF tag A, and a resulting communication result A is output from the reader writer 10. That is, the data to be exchanged between the reader writer 10 and the host device 30 is updated so as to include the communication result A. At this time, the reader writer 10 changes the update flag from off to on (timing TGA of FIG. 8). In response to the change of the update flag from off to on, the host device 30 accesses the exchanged data and reads the communication result A. Subsequently, when a following RF tag B enters the communication-feasible region AR, communication processing is similarly performed with the RF tag B, and a resulting communication result B is output from the reader writer 10. That is, the data to be exchanged between the reader writer 10 and the host device 30 is updated so as to include the communication result B. At this time, the reader writer 10 changes the update flag from on to off (timing TGB of FIG. 8). In response to the change of the update flag from off to on, the host device 30 accesses the exchanged data and reads the communication result B. Hereinafter, when a new RF tag C enters the communication-feasible region AR, communication processing, output processing of an acquired communication result C, update processing of the update flag, and the like are performed in a similar manner. In addition, in response to the update of the update flag value (second data), the host device 30 acquires the communication result (first data).

As illustrated with timing TGA, TGB, and TGC of FIG. 8, it is preferable to update the communication result (first data) and the update flag (second data) with identical timing, but it is not necessary to update the first data and the second data with strictly identical timing. For example, the update flag value may be updated (reversed) after output of the communication result.

Note that when the output of the acquired communication result is completed, the reader writer 10 transitions to a state of waiting for communication processing with the following RF tag 8 (wait for RF tag). Therefore, switching time is short after communication processing with the preceding RF tag 8 is finished and until communication processing with the following RF tag 8 can be performed, and possibility of communication loss can be extremely low.

In addition, as the communication interface 102 (communication unit) that exchanges data between the reader writer 10 and the host device 30, any communication method can be employed (such as the Ethernet, serial communication, USB communication, parallel communication, and various field buses). In addition, the communication interface 102 may be a network configuration in which the reader writer 10 and the host device 30 are connected one-to-one. Alternatively, the communication interface 102 may be a one-to-N network configuration in which a plurality of reader writers 10 is connected to the single host device 30.

As illustrated in FIG. 8, the update flag (second data) is preferably maintained at an updated value until the communication result (first data) is further updated. As conditions for the host device 30 to read the communication result, a condition that the update flag value changes from a previous value can be employed, and it is not necessary to monitor the change in the update flag value in real-time under this condition. In other words, it is unnecessary to monitor the change in the update flag value that becomes on for only one scan period as illustrated in FIG. 7 described above, and it is only necessary to scan the update flag at least once during a period in which a certain communication result is maintained. Therefore, even the communication method that does not ensure real time processing (synchronization), such as the Ethernet, can implement the interface illustrated in FIG. 8. In addition, not only connection through a communication cable, but also the shared memory or a shared bus may be provided to allow data exchange between the reader writer 10 and the host device 30.

Furthermore, in the host device 30, timeout processing can be easily mounted for determining reading finish of the RF tag 8, reading error of the RF tag 8, and the like, by performing timer monitoring of time needed for the update flag (second data) to switch (for example, time needed for the update flag to switch from on to off, and to switch to on again).

As the communication result, in addition to data itself read from the RF tag 8, various kinds of additional information may be added (for example, a reception level of the answering signal from the RF tag 8). Also, a status value indicating propriety of communication with the RF tag 8 (communication success or communication error) may be added. Note that when data cannot be read from the RF tag 8, only a communication error may be output as the communication result.

<F. Processing Procedure in Reader Writer 10>

Next, a processing procedure for acquiring the communication result from the RF tag 8 and sending the communication result to the host device 30 illustrated in FIG. 8 will be described.

Figure 9:
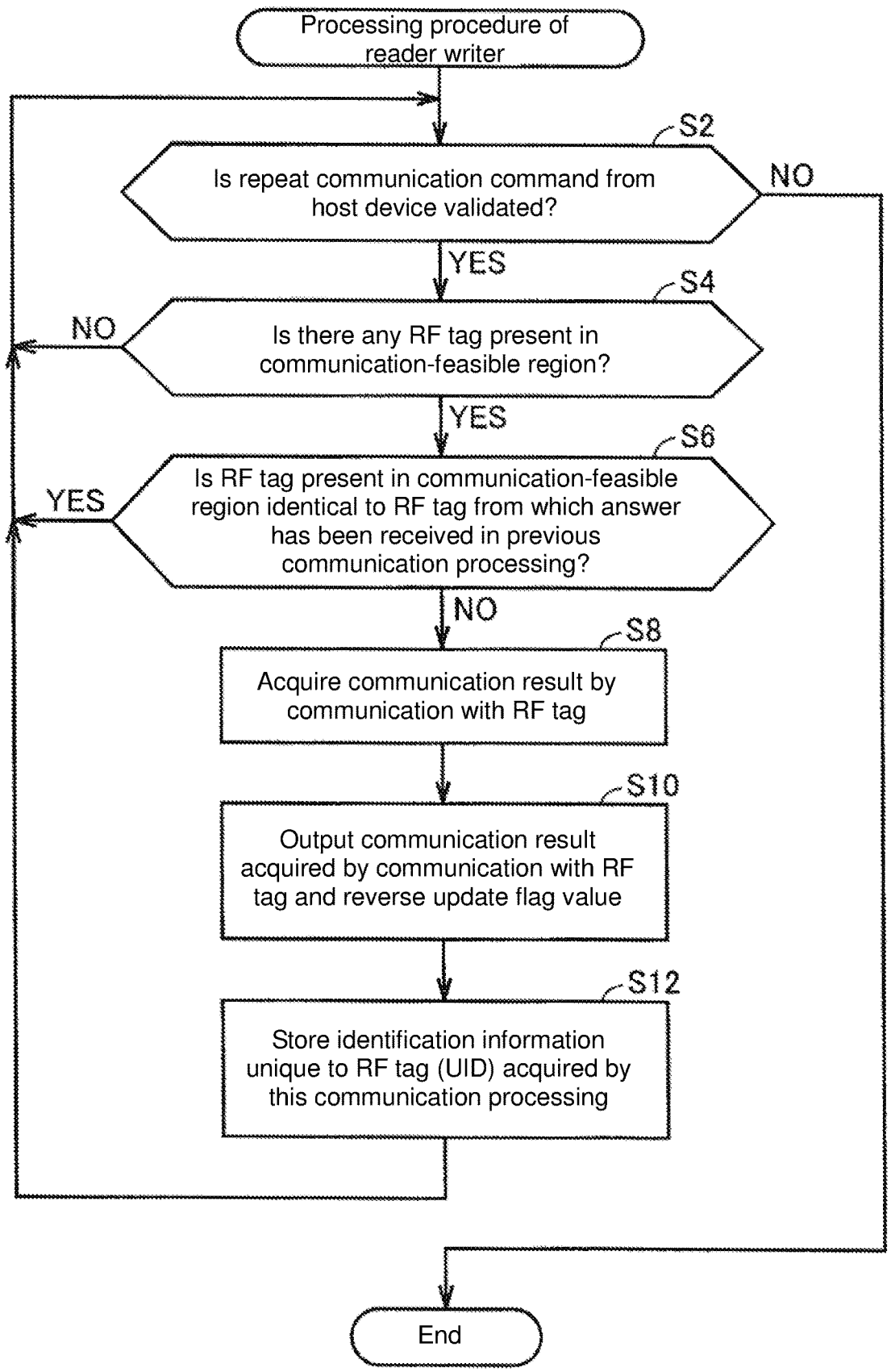
FIG. 9 is a flowchart illustrating a processing procedure to be executed by the reader writer of the embodiment.

FIG. 9 is a flowchart illustrating a processing procedure to be executed in the reader writer 10 of the embodiment. Each step illustrated in FIG. 9 is typically executed by the controller 100 of the reader writer 10.

With reference to FIG. 9, to begin with, the controller 100 of the reader writer 10 determines whether the repeat communication command from the host device 30 is validated (step S2). That is, the controller 100 determines whether the host device 30 instructs the RF tag 8 to repeatedly perform communication. When the repeat communication command from the host device 30 is not validated (NO in step S2), the processing ends.

When the repeat communication command from the host device 30 is validated (YES in step S2), the controller 100 determines whether there is any RF tag 8 present in the communication-feasible region AR (step S4). Specifically, the controller 100 sends out the electromagnetic wave generated by the transmitter 14 (FIG. 2) from the antenna coil 140, and determines whether the receiver 16 receives any answer to the electromagnetic wave from the RF tag 8. According to a typical example of mounting, the controller 100 sends out a carrier wave on which an "inventory command" for recognizing the RF tag 8 is superimposed, and determines whether there is any answer from the RF tag 8. When no RF tag 8 is present in the communication-feasible region AR (NO in step S4), the processing of step S2 and below is repeated.

In contrast, when some RF tag 8 is present in the communication-feasible region AR (YES in step S4), the controller 100 determines whether the RF tag 8 present in the communication-feasible region AR is identical to the RF tag 8 from which the answer has been received in the previous communication processing (step S6). That is, the controller 100 executes processing for avoiding overlapped acquisition of the communication result from the RF tag 8 from which the communication result has already been acquired. According to a typical example of mounting, the answer from the RF tag 8 when sending out the carrier wave on which the "inventory command" is superimposed includes identification information unique to the RF tag 8 (UID). The controller 100 determines identity of the RF tag 8 on the basis of whether this identification information is identical to identification information acquired in the previous communication processing. When the RF tag 8 present in the communication-feasible region AR is identical to the RF tag 8 from which the answer has been received in the previous communication processing (YES in step S6), the processing of step S2 and below is repeated.

In contrast, when the RF tag 8 present in the communication-feasible region AR is not identical to the RF tag 8 from which the answer has been received in the previous communication processing (NO in step S6), the controller 100 acquires the communication result by communication with the RF tag 8 (step S8).

Subsequently, the controller 100 reverses the update flag value while outputting the communication result acquired by communication with the RF tag 8 (step S10). That is, the controller 100 updates the communication result exchanged with the host device 30 by the communication interface 102 so as to include data read from the RF tag 8. Note that when data cannot be read from the RF tag 8, only a communication error may be output as the communication result. In addition, in association with timing with which the communication result is updated, the controller 100 updates the update flag to be exchanged with the host device 30 by the communication interface 102 to a value different from a previous value.

Subsequently, the controller 100 stores the identification information unique to the RF tag 8 (UID) acquired by this communication processing (step S12). This identification information (UID) to be stored is used for the determination processing of step S6 from next time. Then, the processing of step S2 and below is repeated.

<G. Exemplary Program in Host Device 30>

Next, one example of the program in the host device 30 for the interface between the reader writer 10 and the host device 30 illustrated in FIG. 8 and FIG. 9 will be described.

Figure 10:
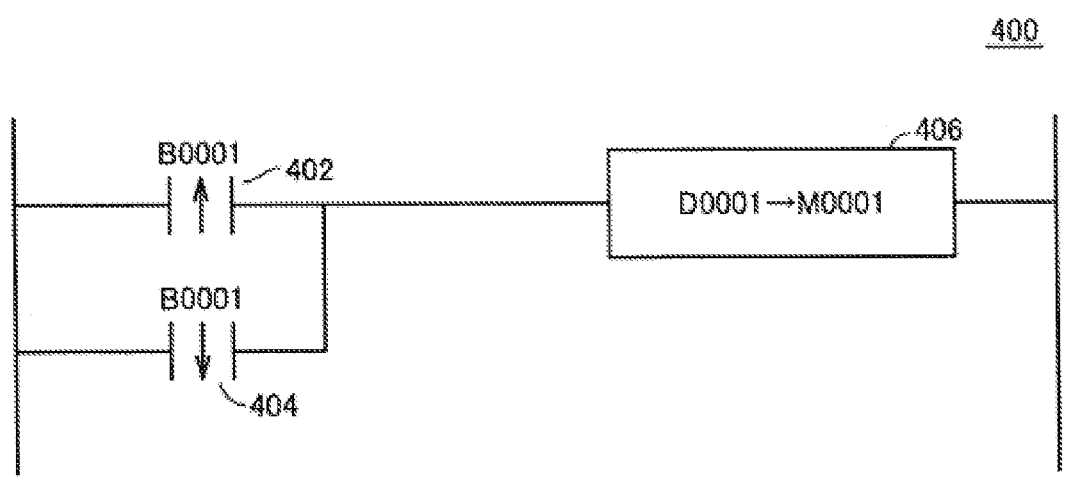
FIG. 10 is a ladder diagram illustrating one example of a program to be executed by the host device of the embodiment.

FIG. 10 is a ladder diagram illustrating one example of the program to be executed by the host device 30 of the embodiment. FIG. 10 illustrates a sequence program to be executed by the PLC, which is a typical example of the host device 30, in a ladder format. However, a representation format of the program is not limited to this example, but any format can be employed.

With reference to FIG. 10, in a ladder program 400, logical sum (OR) output of a rising derivative element 402 and a falling derivative element 404 is defined as an execution start condition for a function block 406. Both the rising derivative element 402 and the falling derivative element 404 are based on the update flag (see (c) of FIG. 8) as input. More specifically, when the update flag value changes from off to on, the rising derivative element 402 turns on, and when the update flag value changes from on to off, the falling derivative element 404 turns on. Therefore, in whichever direction the update flag value changes, the function block 406 will be executed.

The function block 406 includes processing for copying a communication result (D0001) that is output from the reader writer 10 to an internal memory (M0001). This processing allows the host device 30 to acquire the communication result that is output from the reader writer 10.

As illustrated in FIG. 10, the RFID system 1 of the embodiment can simplify the program for acquiring the communication result from the reader writer 10 mounted in the host device 30.

<H. Other Modes>

The following modes can also be employed as variations of the above-described embodiment.

(h1: Employment of Update Counter)

For example, in the interface illustrated in FIG. 8, as one example of updating the update flag (second data) to be exchanged with the host device 30 by the communication interface 102 (communication unit) to a value different from a previous value, mounting of employing the toggle signal (or flicker signal) has been described. However, another mounting may be employed.

For example, when the communication result is updated so as to include data acquired from the RF tag 8, the update may be notified by changing some counter value. As a specific example of changing the counter value, a method of increasing (incrementing) or decreasing (decrementing) the counter value by a predetermined value can be employed. Alternatively, the counter value may be changed randomly. In either method, it is sufficient that only the value changes before or after the communication result from the RF tag 8 is updated.

Figure 11:
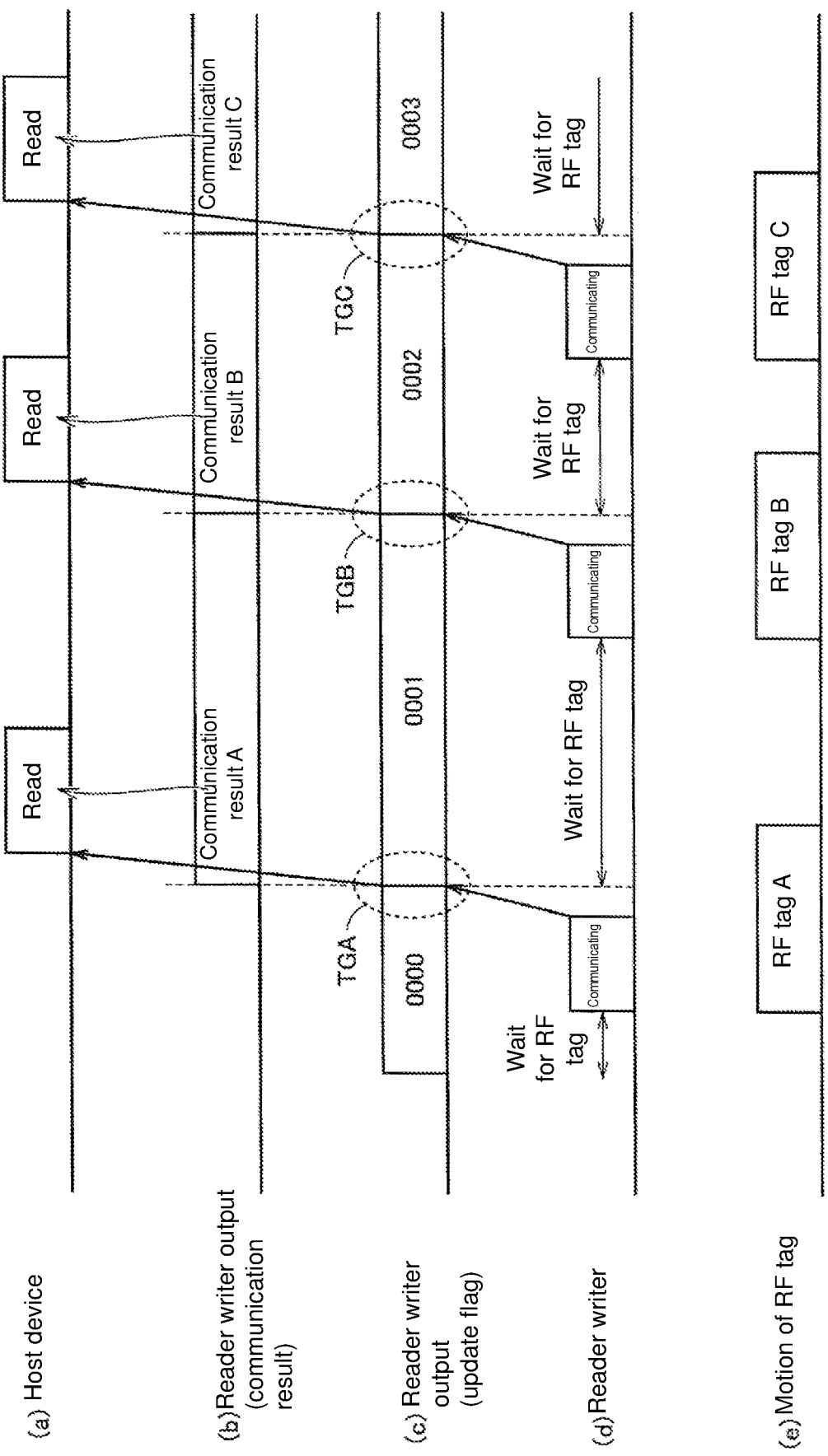
FIG. 11 is a time chart for describing the interface between the reader writer (communication device) and the host device in a first variation of the embodiment.

FIG. 11 is a time chart for describing the interface between the reader writer 10 (communication device) and the host device 30 in a first variation of the embodiment. Compared with the time chart illustrated in FIG. 8, the time chart illustrated in FIG. 11 employs an update counter instead of the update flag (see (c) Reader writer output (update counter)). This update counter is incremented every time the communication result is updated. The host device 30 detects the increment of this update counter and acquires the updated communication result.

More specifically, every time data is sequentially read from the RF tag 8 that passes the communication-feasible region AR, the controller 100 of the reader writer 10 (FIG. 2) updates the communication result (first data) to be exchanged with the host device 30 by the communication interface 102 (communication unit) so as to include the read data (see (b) Reader writer output (communication result)). Also, in association with timing with which the communication result (first data) is updated, the controller 100 of the reader writer 10 increments the update counter (second data) to be exchanged with the host device 30 by the communication interface 102 (communication unit) (see (c) Reader writer output (update counter)).

(h2: Holding a Plurality of Communication Results)

For example, in the interface illustrated in FIG. 8, as one example of updating the communication result (first data) to be exchanged with the host device 30 by the communication interface 102 (communication unit) so as to include the data read from the RF tag 8, mounting of outputting only the read data has been described. However, a plurality of pieces of past data may be output.

Figure 12:
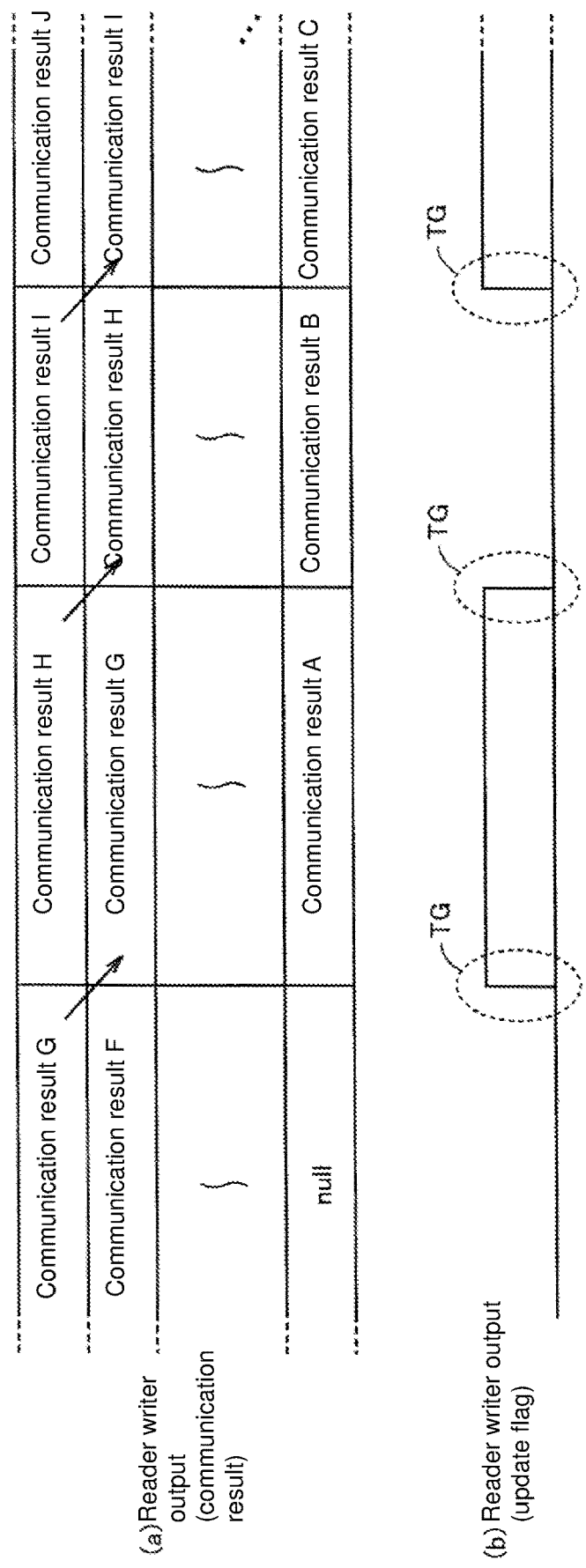
FIG. 12 is a time chart for describing the interface between the reader writer (communication device) and the host device in a second variation of the embodiment.

FIG. 12 is a time chart for describing the interface between the reader writer 10 (communication device) and the host device 30 in a second variation of the embodiment. In the time chart illustrated in FIG. 12, the reader writer 10 outputs a plurality of (for example, eight) pieces of past data (communication results) including data read from some RF tag 8 (communication result). At this time, each communication result is output in order associated with the time order of acquisition. The host device 30 can acquire the past communication results as necessary while acquiring the latest communication result in accordance with the order of the communication result to be output.

Thus, even in a case where the communication result from the reader writer 10 cannot be acquired due to processing delay in the host device 30 or the like, outputting the plurality of communication results enables recovery. In addition, since the acquired communication results are placed on a time-series basis, consistency of the communication results and the like can be checked each time on the host device 30 side.

(h3: Application to Writing)

In the above-described embodiment, processing for reading data from the RF tag 8 has been described, but this is also applicable to writing data into the RF tag 8. For example, this is also applicable to applications of sequentially assigning pieces of identification information different from each other to management target articles.

<I. Advantages>

As described above, in the RFID system 1 of the embodiment, every time reading data from the RF tag 8, the reader writer 10 (communication device) only needs to change the value of the update flag or the update counter while outputting the communication result including the read data. The host device 30 only needs to monitor the value of the update flag or the update counter, and to acquire the communication result in response to the value change.

Therefore, both setting on the reader writer 10 side and the program to be mounted in the host device 30 can be simplified, and time, effort, and cost needed for setup of the RFID system 1 can be reduced.

In addition, in the RFID system 1 of the embodiment, the procedure for the reader writer 10 to output the communication result acquired by performing communication processing with the RF tag 8 has been simplified. Also, it is possible to extremely shorten time after the communication processing with the preceding RF tag 8 is completed and until the RFID system 1 becomes ready to perform communication processing with the following RF tag 8. Therefore, the possibility of communication loss can be further reduced.

The embodiment disclosed this time should be considered in all respects as illustrative and not restrictive. The scope of the present invention is indicated by the appended claims rather than by the foregoing description, and all changes that come within the meaning and range of equivalency of the claims are therefore intended to be embraced therein.

DESCRIPTION OF SYMBOLS 1 system,
2 conveyor belt
4, 4_1, 4_2 pallet
6, 6_1, 6_2 work
8, 8_1, 8_2 RF tag
10 reader writer
12 communication controller
14 transmitter
16 receiver
18 reception level detector
20 antenna
30 host device
100 controller
102,316 communication interface
104 storage
106 timekeeper
108 display
110 drive circuit
112 modulation circuit
114 multiplication circuit
116,120 Z transform circuit
118,128 amplification circuit
122 band pass filter
124,132 detection circuit
126 low pass filter
130 comparator
134 conversion circuit
136 oscillation circuit
140 antenna coil
302 processor
304 chip set
306 main memory
308 flash memory
310 system program
312 user program
318 memory card interface
320 memory card
322 internal bus controller
324 field bus controller
326, 328 I/O unit

The invention claimed is:

1. A communication device comprising:
a communicator comprising a transmitter and a receiver configured to communicate with a radio frequency (RF) tag in a non-contact manner;
a communication interface that exchanges data with a host device; and
a controller configured to perform operations comprising operations to control the communicator and the communication interface,
wherein
in response to the communicator sequentially reading data from the RF tag that passes a communication-feasible region near the communicator at regular time intervals or irregular time intervals, the controller is configured to perform operations comprising:
beginning updating first data to be exchanged with the host device by the communication interface so as to comprise the read data;
in response to beginning updating the first data to comprise the read data, notifying the host device that the first data is being updated by updating second data, which notifies the host device that the first data is being updated; and
in response to completing updating the first data to comprise the read data, notifying the host device that the first data is accessible, the first data to be exchanged with the host device by the communication interface to a value different from a previous value in association with a timing with which the first data is updated.

2. The communication device according to claim 1, wherein
the second data comprises an update value, and
the controller is configured to perform operations further comprising alternately setting, as the update value a first status value and a second status value.

3. The communication device according to claim 1, wherein the controller is configured to perform operations further comprising incrementing the value of the second data in association with the timing with which the first data is updated.

4. The communication device according to claim 1, wherein the controller is configured to perform operations further comprising updating the first data and the second data with identical timing.

5. The communication device according to claim 1, wherein the controller is configured to perform operations further comprising maintaining the second data at an updated value until further updating the first data.

6. A system comprising:
a communication device; and
a host device, wherein
the communication device comprises:
a communicator comprising a transmitter and a receiver configured to communicate with a radio frequency (RF) tag in a non-contact manner;
a communication interface that exchanges data with the host device; and
a controller configured to perform operations comprising operations to control the communicator and the communication interface,
in response to the communicator sequentially reading data from the RF tag that passes a communication-feasible region near the communicator at regular time intervals or irregular time intervals, the controller is configured to perform operations comprising:
beginning updating first data to be exchanged with the host device by the communication interface so as to comprise the read data;
in response to beginning updating the first data to comprise the read data, notifying the host device that the first data is being updated by updating second data, which notifies the host device that the first data is being updated; and
in response to completing updating the first data to comprise the read data, notifying the host device that the first data is accessible, the first data to be exchanged with the host device by the communication interface to a value different from a previous value in association with a timing with which the first data is updated, and
the host device acquires the first data in response to the update of the value of the second data.

7. The system according to claim 6, wherein the second data comprises an update value, and the controller is configured to perform operations further comprising alternately setting, as the update value, a first status value and a second status value.

8. The system according to claim 6, wherein the controller is configured to perform operations further comprising incrementing the value of the second data in association with the timing with which the first data is updated.

9. The system according to claim 6, wherein the controller is configured to perform operations further comprising updating the first data and the second data with identical timing.

10. The system according to claim 6, wherein the controller is configured to perform operations further comprising maintaining the second data at an updated value until further updating the first data.

* * * * *